(12) United States Patent
Furuya et al.

(10) Patent No.: US 12,425,122 B2
(45) Date of Patent: Sep. 23, 2025

(54) INFORMATION LEAKAGE PREVENTION SHIELD DEVICE

(71) Applicant: Mitsubishi Electric Corporation, Tokyo (JP)

(72) Inventors: Koichi Furuya, Tokyo (JP); Tsuyoshi Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 343 days.

(21) Appl. No.: 18/201,507

(22) Filed: May 24, 2023

(65) Prior Publication Data

US 2023/0299870 A1 Sep. 21, 2023

Related U.S. Application Data

(63) Continuation of application No. PCT/JP2021/002939, filed on Jan. 28, 2021.

(51) Int. Cl.
    H04K 3/00 (2006.01)
(52) U.S. Cl.
    CPC ............ H04K 3/62 (2013.01); H04K 3/42 (2013.01)
(58) Field of Classification Search
    CPC ........ H04K 3/62; H04K 3/42; H04K 2203/14; H04K 2203/34; H04K 3/68; H04K 3/825; G06F 21/75
    See application file for complete search history.

(56) References Cited

U.S. PATENT DOCUMENTS

| | | | |
|---|---|---|---|
| 7,773,948 B2* | 8/2010 | Benjebbour | H04L 25/03853 375/349 |
| 7,889,866 B2* | 2/2011 | Masugi | H04K 1/02 713/192 |
| 2003/0081400 A1* | 5/2003 | Agrawal | G06F 21/755 702/191 |

(Continued)

FOREIGN PATENT DOCUMENTS

JP 2016-1796 A 1/2016

OTHER PUBLICATIONS

"Frequency modulation," In: Wikipedia, the free encyclopedia. Jan. 21, 2021, 6 pages total.

(Continued)

*Primary Examiner* — Lewis G West
(74) *Attorney, Agent, or Firm* — Birch, Stewart, Kolasch & Birch, LLP

(57) ABSTRACT

An information leakage prevention shield device includes a control unit to output a frequency setting signal for setting a filter frequency for an electromagnetic wave emitted from a device, and a modulation signal based on a time variation pattern for sequentially instructing a plurality of different transmission characteristics over time, and a dynamic electromagnetic-wave filter having a filter frequency set by a frequency setting signal from the control unit, having the plurality of different transmission characteristics over time set by the modulation signal from the control unit, to transmit an electromagnetic wave other than the filter frequency set by the frequency setting signal, and to have the plurality of different transmission characteristics over time set by the modulation signal with respect to the filter frequency set by the frequency setting signal.

14 Claims, 5 Drawing Sheets

(56) References Cited

U.S. PATENT DOCUMENTS

| | | | | |
|---|---|---|---|---|
| 2003/0083831 | A1* | 5/2003 | Agrawal | G06F 21/556 |
| | | | | 702/65 |
| 2003/0084333 | A1* | 5/2003 | Archambeault | G06F 21/556 |
| | | | | 726/34 |
| 2005/0162338 | A1* | 7/2005 | Ikeda | G09G 5/006 |
| | | | | 345/2.1 |
| 2011/0065409 | A1* | 3/2011 | Kenington | H04B 1/126 |
| | | | | 455/307 |
| 2017/0328939 | A1* | 11/2017 | Quan | H04R 29/004 |
| 2018/0054175 | A1* | 2/2018 | Fok | H03H 2/003 |

OTHER PUBLICATIONS

"Radio jamming." In: Wikipedia, the free encyclopedia, Jan. 6, 2021, 9 pages total.

German Office Action for German Application No. 11 2021 006 146.1, dated Mar. 21, 2024, with English translation.

D. Ramaccia et al., "Phase-Induced Frequency Conversion and Doppler Effect With Time-Modulated Metasurfaces," IEEE Transactions on Antennas and Propagation, vol. 68, No. 3, Mar. 2020, pp. 1607-1617.

German Summons to Attend Oral Hearing for German Application No. 11 2021 006 146.1, dated Apr. 23, 2025, with English translation.

* cited by examiner

INFORMATION LEAKAGE PREVENTION SHIELD DEVICE

CROSS REFERENCE TO RELATED APPLICATIONS

This application is a Continuation of PCT International Application No. PCT/JP2021/002939 filed on Jan. 28, 2021, which is hereby expressly incorporated by reference into the present application.

TECHNICAL FIELD

The present disclosure relates to an information leakage prevention shield device that prevents information leakage due to electromagnetic waves emitted from a device such as an information device.

BACKGROUND ART

In recent years, as a measure for preventing information leakage from a device such as an information device caused by receiving and demodulating electromagnetic waves emitted from the device, Patent Literature 1 discloses an information leakage prevention device that prevents electromagnetic waves from leaking through a window to the outside.

That is, Patent Literature 1 discloses an information leakage prevention device that specifies a frequency to be attenuated when receiving electromagnetic waves emitted from a device, specifies an incident direction of the electromagnetic wave of the specified frequency, applies a predetermined voltage based on the specified frequency and the specified incident angle to a special structure unit that absorbs the electromagnetic wave of the specified frequency, and attenuates a frequency component matching a harmonic component of a dot clock frequency of a leaked electromagnetic wave by the special structure unit.

CITATION LIST

Patent Literature

Patent Literature 1 JP 2016-1796 A

SUMMARY OF INVENTION

Technical Problem

The information leakage prevention device disclosed in Patent Literature 1 attenuates a frequency component matching a harmonic component of a dot clock frequency of an electromagnetic wave emitted from a device to reduce the intensity of a leaked electromagnetic wave received by an eavesdropping device. Therefore, there is a problem that even with weak leaked electromagnetic waves after being attenuated by the information leakage prevention device, by attempting eavesdropping over time during a period in which leaked electromagnetic waves are emitted and averaging the eavesdropped leaked electromagnetic waves, information may be stolen from the leaked electromagnetic waves.

The present disclosure has been made to solve the above problems, and an object of the present disclosure is to obtain an information leakage prevention shield device capable of reducing the possibility that information is stolen from electromagnetic waves emitted from a device.

Solution to Problem

An information leakage prevention shield device according to the present disclosure includes a controller to output a frequency setting signal for setting a filter frequency for an electromagnetic wave emitted from a device, and a modulation signal based on a time variation pattern for sequentially instructing a plurality of different transmission characteristics over time; and at least one dynamic electromagnetic-wave filter having the filter frequency set by the frequency setting signal from the controller, having the plurality of different transmission characteristics over time set by the modulation signal from the controller, to transmit an electromagnetic wave other than the filter frequency set by the frequency setting signal, and to have the plurality of different transmission characteristics over time set by the modulation signal with respect to the filter frequency set by the frequency setting signal.

Advantageous Effects of Invention

According to the present disclosure, it is possible to improve an effect of preventing information from leaking from electromagnetic waves emitted from a device such as an information device.

DESCRIPTION OF EMBODIMENTS

First Embodiment

An information leakage prevention shield device 100 according to a first embodiment will be described with reference to FIGS. 1 to 7.

Figure 1:
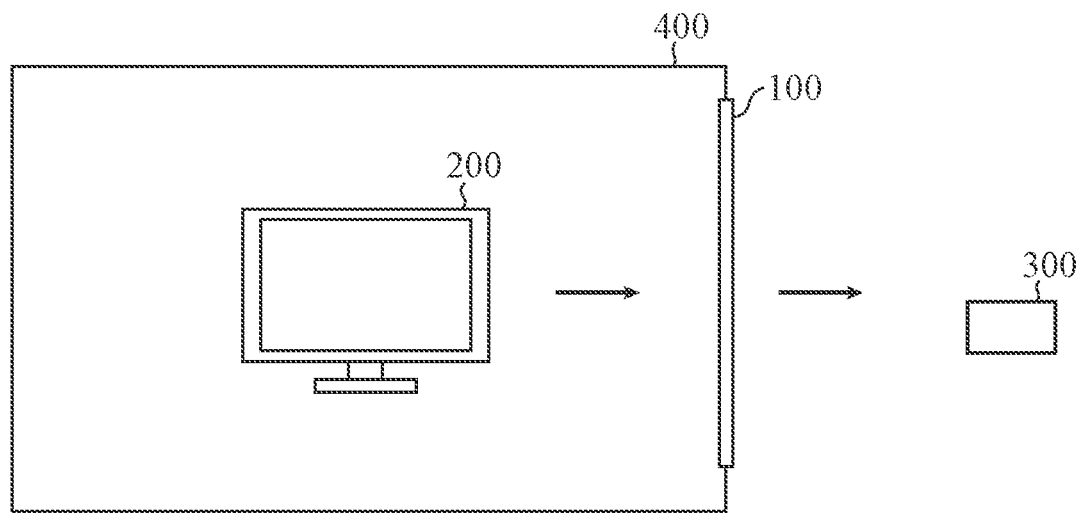
FIG. 1 is a schematic diagram illustrating a state where an information leakage prevention shield device according to a first embodiment is installed.

As illustrated in FIG. 1, the information leakage prevention shield device 100 is installed in a structure 400 that separates a device 200 such as an information device from an eavesdropping device 300.

The device 200 is an intercept target device that can be an eavesdropping target, and a monitor is assumed as the device 200 in the first embodiment. However, the number of monitors is not limited to one, and there may be a plurality of monitors. In addition to the monitors, the information leakage prevention shield device 100 according to the first embodiment can also be applied to devices that intentionally or unintentionally emit electromagnetic waves, such as wireless communication devices and printers.

In the description of the present disclosure, the information to be intercepted is mainly image information displayed by the monitor. However, the information to be intercepted may be the content of wireless communication included in radio waves emitted by a wireless communication device, print information of a printer, or the like. In short, the information leakage prevention shield device according to the present disclosure can be used for information intentionally or unintentionally emitted as radio waves.

The eavesdropping device 300 includes an antenna, a receiving device, and the like used by an eavesdropper.

The structure 400 is a structure such as a housing or a cover surrounding the device 200, or a curtain, a glass window or the like of a building in which the device 200 is disposed.

Figure 2:
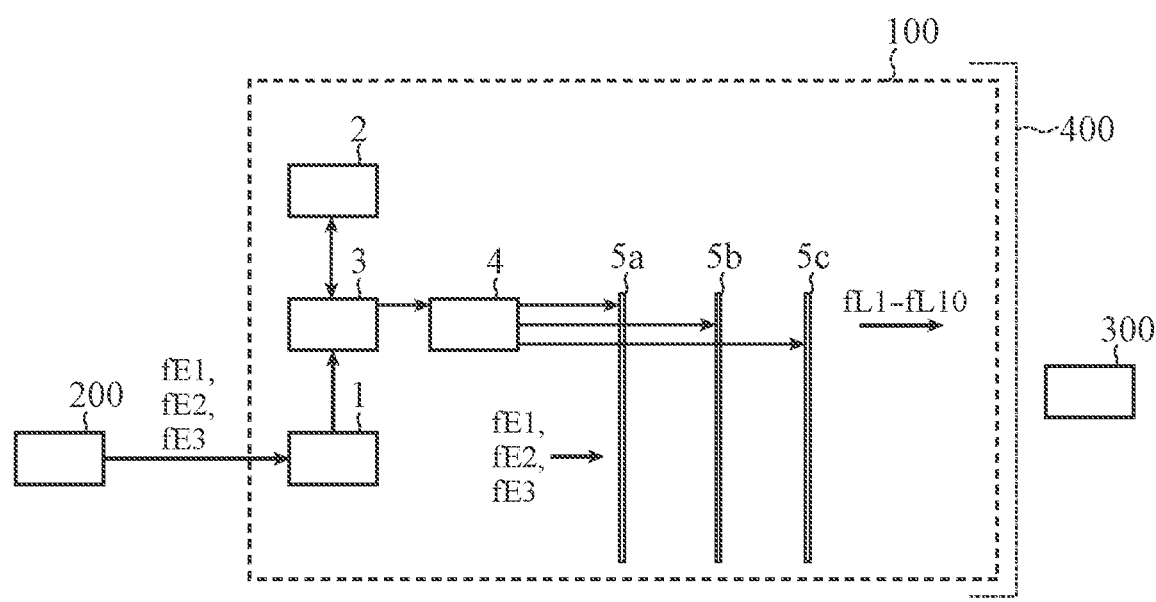
FIG. 2 is a configuration diagram illustrating the information leakage prevention shield device according to the first embodiment.

As illustrated in FIG. 2, the information leakage prevention shield device 100 includes an electromagnetic-wave detection unit 1, a storage unit 2, a modulation-signal generation unit 3, a control-signal output unit 4, and a first dynamic electromagnetic-wave filter 5a to a third dynamic electromagnetic-wave filter 5c.

The information leakage prevention shield device 100 is described as including three dynamic electromagnetic-wave filters 5, that is, the first dynamic electromagnetic-wave filter 5a to the third dynamic electromagnetic-wave filter 5c, but may include one dynamic electromagnetic-wave filter 5, two dynamic electromagnetic-wave filters 5, and four or more dynamic electromagnetic-wave filters 5.

Note that, in the following description, in particular, in a case where it is not necessary to individually specify and describe each of the first dynamic electromagnetic-wave filter 5a to the third dynamic electromagnetic-wave filter 5c, the subscripts a to c are omitted in order to avoid complexity.

The electromagnetic-wave detection unit 1 detects electromagnetic waves (emissions) including image information emitted from the device 200, and outputs a frequency of the detected electromagnetic wave to the modulation-signal generation unit 3.

Furthermore, the electromagnetic-wave detection unit 1 extracts, for example, background information from the electromagnetic waves emitted from the surrounding area of the device 200, detects a frequency of a background noise from the background information, and outputs the detected frequency of the background noise to the modulation-signal generation unit 3.

Detection of the frequency of electromagnetic waves and extraction of a feature of information from the electromagnetic waves by the electromagnetic-wave detection unit 1 are performed by generally known techniques.

The frequency of the electromagnetic waves emitted from the device 200 detected by the electromagnetic-wave detection unit 1 is a frequency assumed to include screen information in the electromagnetic waves emitted from the device 200, specifically, a frequency called a dot clock frequency of the screen information, and a frequency corresponding to a harmonic of an integral multiple thereof.

In the following description, the frequency of the electromagnetic waves emitted from the device 200 detected by the electromagnetic-wave detection unit 1 is simply described as the frequency of the electromagnetic waves emitted from the device 200.

Note that, in a case where the device 200 on which information leakage prevention is performed is known in advance, by storing the frequencies of the electromagnetic waves emitted from the device 200 in the storage unit 2, the electromagnetic-wave detection unit 1 can be made unnecessary.

The storage unit 2 stores a modulation scheme in which a plurality of different transmission phases are switched over time.

The modulation schemes stored in the storage unit 2 are first to fifth modulation schemes. The first to fifth modulation schemes will be described later in detail.

Note that the modulation scheme is not limited to the first to fifth modulation schemes, and may be any modulation scheme as long as the modulation scheme sequentially switches transmission characteristics being a transmission amplitude and a transmission phase over time with respect to the filter frequency set in the dynamic electromagnetic-wave filter 5.

The modulation-signal generation unit 3 receives the frequency of the electromagnetic waves emitted from the device 200 detected by the electromagnetic-wave detection unit 1 or the frequency of the electromagnetic waves emitted from the device 200 stored in the storage unit 2, determines a filter frequency for the electromagnetic waves emitted from the device 200, reads at least one of the modulation schemes stored in the storage unit 2, that is, the first to fifth modulation schemes, and generates a time variation pattern for sequentially instructing a plurality of different transmission characteristics over time on the basis of the read modulation scheme.

In order to generate the time variation pattern, the modulation-signal generation unit 3 determines a modulation method for the dynamic electromagnetic-wave filter 5 in consideration of various factors.

Specifically, the modulation method determined by the modulation-signal generation unit 3 is determined on the basis of various conditions such as the modulation scheme of the dynamic electromagnetic-wave filter 5, a modulation period in the case of periodic modulation, the time during which modulation continues, and the distribution of the modulation method for each position in the dynamic electromagnetic-wave filter 5, and at least one of the modulation schemes stored in the storage unit 2, that is, the first to fifth modulation schemes is read.

In addition, factors in the modulation method determined by the modulation-signal generation unit 3 include the frequency and level of the electromagnetic waves emitted from the device 200, the features of the screen display of the monitor in the device 200, the presence or absence of movement of the monitor, the duration of installation of the monitor, the number of monitors, the electromagnetic environment around the structure 400, particularly the presence or absence of the background noise and the level of the background noise due to the electromagnetic waves emitted from the surrounding area of the device 200, and the like.

As an example of the factors, the electromagnetic environment around the structure 400 is described. For example, in a case where a relatively high level of the background noise is present in the surrounding area, the modulation scheme read from the storage unit 2 by the modulation-signal generation unit 3 is assumed to be "first numerical example of second modulation scheme" to be described later.

The modulation-signal generation unit 3 generates a time variation pattern based on "first numerical example of second modulation scheme", and the transmission phase of the dynamic electromagnetic-wave filter 5 is controlled by a modulation signal based on the time variation pattern.

In this case, the leaked radio wave from the dynamic electromagnetic-wave filter 5 to which the electromagnetic waves emitted from the device 200 are input is converted into the frequency of the background noise around the structure 400.

As a result, since a relatively high level of the background noise is superimposed on leaked electromagnetic waves received by the eavesdropper, an image reproduced by the eavesdropper becomes an unclear image including a lot of noise.

On the other hand, in a case where the level of the surrounding background noise is relatively low, the modulation scheme read from the storage unit 2 by the modulation-signal generation unit 3 is "second numerical example of second modulation scheme" to be described later.

The modulation-signal generation unit 3 generates a time variation pattern based on "second numerical example of second modulation scheme", and the transmission phase of the dynamic electromagnetic-wave filter 5 is controlled by a modulation signal based on the time variation pattern.

In this case, the dynamic electromagnetic-wave filter 5 diffuses and emits the frequency of the electromagnetic waves emitted from the device 200.

The level of the electromagnetic wave at each frequency after the frequency diffusion by the dynamic electromagnetic-wave filter 5 is reduced as compared with the level of the electromagnetic wave emitted from the device 200 in the leaked electromagnetic wave.

As a result, the relative level of the background noise with respect to the level of the leaked electromagnetic wave received by the eavesdropper is increased, so that an image reproduced by the eavesdropper becomes an unclear image including a lot of noise.

Figure 3:
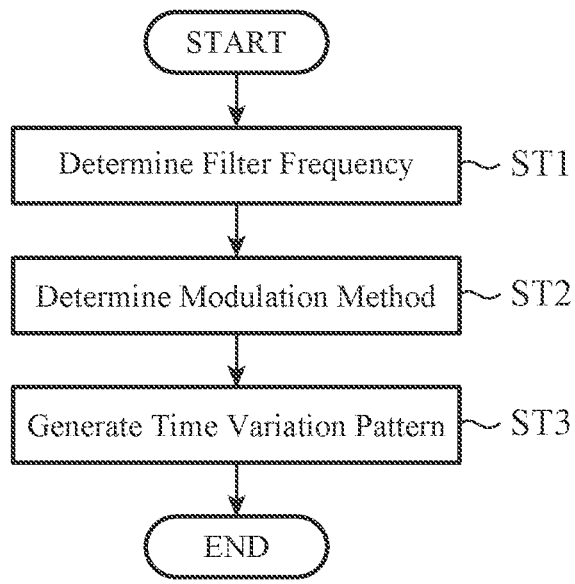
FIG. 3 is a flowchart illustrating an operation of a modulation-signal generation unit in the information leakage prevention shield device according to the first embodiment.

The modulation-signal generation unit 3 performs an operation illustrated in FIG. 3.

That is, in step ST1, the filter frequencies of the first dynamic electromagnetic-wave filter 5a to the third dynamic electromagnetic-wave filter 5c with respect to the frequency of the electromagnetic waves emitted from the device 200 are determined.

In step ST2, a modulation method for each of the first dynamic electromagnetic-wave filter 5a to the third dynamic electromagnetic-wave filter 5c is determined in consideration of various factors.

In step ST3, a time variation pattern representing the determined filter frequency and modulation method is generated.

The control-signal output unit 4 outputs a frequency setting signal for setting a filter frequency for the electromagnetic waves emitted from the device 200 generated by the modulation-signal generation unit 3 and a modulation signal based on the time variation pattern generated by the modulation-signal generation unit 3 to the first dynamic electromagnetic-wave filter 5a to the third dynamic electromagnetic-wave filter 5c.

The modulation signal from the control-signal output unit 4 is a signal for implementing a time variation pattern for sequentially instructing a plurality of different transmission characteristics over time generated by the modulation-signal generation unit 3, and is, for example, a signal for applying a bias voltage for controlling an active element incorporated in the dynamic electromagnetic-wave filter 5 or a signal for mechanically changing the shape of the filter in the dynamic electromagnetic-wave filter 5.

The filter frequency is set to the frequency of the electromagnetic waves emitted from the device 200.

Note that the filter frequency not only means the specified frequency but can also mean a frequency band.

In addition, the filter frequency for the electromagnetic waves emitted from the device does not need to be generated by the modulation-signal generation unit 3, and the control-signal output unit 4 may directly set, as the frequency setting signal, the frequency of the electromagnetic waves emitted from the device 200 detected by the electromagnetic-wave detection unit 1 or the frequency of the electromagnetic waves emitted from the device 200 stored in the storage unit 2.

Although the modulation-signal generation unit 3 and the control-signal output unit 4 have been described as separate components, these components may constitute a control unit.

In this case, the control unit receives the frequency of the electromagnetic waves emitted from the device 200 detected by the electromagnetic-wave detection unit 1 or the frequency of the electromagnetic waves emitted from the device 200 stored in the storage unit 2, outputs a frequency setting signal for setting the filter frequency for the electromagnetic waves emitted from the device 200, reads the modulation scheme stored in the storage unit 2, and outputs a modulation signal based on a time variation pattern for sequentially instructing a plurality of different transmission characteristics over time on the basis of the read modulation scheme.

The control unit outputs a modulation signal for operating the dynamic electromagnetic-wave filter 5 in order to implement the time variation pattern for sequentially instructing a plurality of different transmission characteristics over time, and for example, outputs a modulation signal for applying a bias voltage for controlling an active element incorporated in the dynamic electromagnetic-wave filter 5 or a modulation signal for mechanically changing the shape of the filter in the dynamic electromagnetic-wave filter 5.

The modulation-signal generation unit 3, the control-signal output unit 4, and the storage unit 2 represented by functional blocks in FIG. 2 are configured by a general personal computer (PC) or a microcomputer, and include a CPU, a semiconductor memory (RAM), and a non-volatile recording device (ROM). An execution program stored in a ROM, which is a storage medium serving as the storage unit 2, is loaded into a RAM, and the CPU performs various processes on the basis of the execution program loaded into the RAM. The ROM also functions as a storage medium serving as the storage unit 2, and stores various modulation schemes. The CPU is driven by a general-purpose OS.

The first dynamic electromagnetic-wave filter 5a to the third dynamic electromagnetic-wave filter 5c are arranged in parallel. The first dynamic electromagnetic-wave filter 5a to the third dynamic electromagnetic-wave filter 5c may be sequentially brought into contact with each other to be integrated.

In the dynamic electromagnetic-wave filter 5, the filter frequencies are set by the frequency setting signal from the control-signal output unit 4, and different transmission characteristics are set over time by the modulation signal from the control-signal output unit 4. The dynamic electromagnetic-wave filter 5 transmits the electromagnetic waves having frequencies other than the filter frequencies set by the frequency setting signal, and implements different transmission characteristics over time by the modulation signal with respect to the filter frequencies set by the frequency setting signal. Transmission characteristics refer to a transmission amplitude and a transmission phase.

As a result, by attenuating or suppressing the components of the set filter frequencies from the electromagnetic wave emitted from the device 200, and changing (modulating) the electromagnetic wave emitted from the device 200, the dynamic electromagnetic-wave filter 5 emits a leaked electromagnetic wave as a harmonic component obtained by adding a modulation frequency to the frequency of the electromagnetic wave emitted from the device 200.

In short, the dynamic electromagnetic-wave filter 5 attenuates not only the electromagnetic wave that is the component of the set filter frequency but also electromagnetic waves of all frequency components generated by modulation.

The dynamic electromagnetic-wave filter 5 includes, for example, a frequency selective surface (FSS) or the like, and is a filter for electromagnetic waves that has a two-dimensional surface and is capable of implementing any dielectric constant and magnetic permeability with respect to a wavelength of a set filter frequency in an incident electromagnetic wave, and of dynamically controlling transmission characteristics including a phase change amount (transmission phase) and an attenuation amount (transmission amplitude) of an electromagnetic wave.

The transmission characteristics are controlled by a generally known method such as a method of controlling an active element incorporated in the dynamic electromagnetic-wave filter 5 with an electric signal or a method of controlling the shape of the filter by mechanical driving.

On the other hand, since the dynamic electromagnetic-wave filter 5 transmits light and frequencies other than the filter frequency, even if the information leakage prevention shield device 100 is installed in a window, the inside and the outside of the structure 400 can be visually recognized, and wireless communication can be performed between the inside and the outside of the structure 400.

The dynamic electromagnetic-wave filter 5 has a plurality of cells arranged in a matrix of a plurality of rows and a plurality of columns.

All of the plurality of cells may be set at the same filter frequency by the frequency setting signal from the control-signal output unit 4, and the transmission characteristics thereof may be controlled to be the same by the modulation signal from the control-signal output unit 4.

Alternatively, the plurality of cells may be independently set at different filter frequencies by the frequency setting signal from the control-signal output unit 4, and the transmission characteristics thereof may be controlled differently by the modulation signal from the control-signal output unit 4.

In this case, a plurality of cells may be classified into a plurality of groups, each group may be a dynamic electromagnetic-wave filter unit having a plurality of cells, and different filter frequencies may be independently set in the plurality of dynamic electromagnetic-wave filter units by the frequency setting signal from the control-signal output unit 4, and the transmission characteristics may be controlled differently by the modulation signal from the control-signal output unit 4.

Next, an operation of the information leakage prevention shield device 100 will be described.

When electromagnetic waves including image information are emitted from the device 200, as in step ST1 of FIG. 3, the modulation-signal generation unit 3 receives the frequency of the electromagnetic waves emitted from the device 200 or the frequency of the electromagnetic waves emitted from the device 200 stored in the storage unit 2, and determines the filter frequencies of the first dynamic electromagnetic-wave filter 5a to the third dynamic electromagnetic-wave filter 5c.

The modulation-signal generation unit 3 determines a frequency fE1 (Hz) of the electromagnetic waves emitted from the device 200 as the filter frequency for the first dynamic electromagnetic-wave filter 5a, determines a frequency fE2 (Hz) of the electromagnetic waves emitted from the device 200 as the filter frequency for the second dynamic electromagnetic-wave filter 5b, and determines a frequency fE3 (Hz) of the electromagnetic waves emitted from the device 200 as the filter frequency for the third dynamic electromagnetic-wave filter 5c.

Next, as in step ST2 of FIG. 3, the modulation-signal generation unit 3 selects a modulation scheme from the first to fifth modulation schemes stored in the storage unit 2 in accordance with various factors, and determines a modulation method in accordance with various conditions.

When determining the modulation method, the modulation-signal generation unit 3 generates a time variation pattern representing the determined filter frequency and modulation method as in step ST3 of FIG. 3.

The control-signal output unit 4 outputs a frequency setting signal for setting a filter frequency for the electromagnetic waves emitted from the device 200 generated by the modulation-signal generation unit 3 and a modulation signal based on the time variation pattern generated by the modulation-signal generation unit 3 to the first dynamic electromagnetic-wave filter 5a to the third dynamic electromagnetic-wave filter 5c.

Each of the first dynamic electromagnetic-wave filter 5a to the third dynamic electromagnetic-wave filter 5c has a filter frequency set by the frequency setting signal from the control-signal output unit 4, and is controlled to have different transmission characteristics over time by the modulation signal from the control-signal output unit 4.

That is, the first dynamic electromagnetic-wave filter 5a to the third dynamic electromagnetic-wave filter 5c attenuate or suppress the frequencies fE1 (Hz), fE2 (Hz), and fE3 (Hz) of the electromagnetic waves emitted from the device 200, respectively, and emit the leaked electromagnetic waves in which the frequencies fE1 (Hz), fE2 (Hz), and fE3 (Hz) are modulated on the basis of the time variation pattern.

In the information leakage prevention shield device 100 according to the first embodiment, the dynamic electromagnetic-wave filter 5 attenuates or suppresses the frequency of the electromagnetic waves emitted from the device 200, and emits the leaked electromagnetic wave in which the frequency of the electromagnetic waves emitted from the device 200 is modulated on the basis of the time variation pattern. Therefore, in eavesdropping of the electromagnetic waves emitted from the device 200, accumulation of image data necessary for averaging can be disturbed, and it is possible to reduce the possibility that information is stolen from the electromagnetic waves emitted from the device 200.

Next, a case where the dynamic electromagnetic-wave filter 5 is controlled by each of the first to fifth modulation schemes will be described for each modulation scheme.

<First Modulation Scheme>

A modulation scheme of modulating electromagnetic waves by a pattern of randomly switching transmission characteristics of the dynamic electromagnetic-wave filter 5 in terms of time.

When determining that the transition of the screen display is frequent as the feature of the screen display of the monitor in the device 200, which is one factor for determining the modulation method, on the basis of the electromagnetic waves emitted from the device 200 detected by the electromagnetic-wave detection unit 1, the modulation-signal generation unit 3 reads the first modulation scheme stored in the storage unit 2, and generates a time variation pattern for sequentially instructing a plurality of different transmission phases over time by the pattern of randomly switching the transmission characteristics in terms of time, which is the first modulation scheme.

The transmission characteristic that is randomly switched in terms of time is mainly the transmission phase, but the transmission amplitude may also be changed.

The control-signal output unit 4 outputs a modulation signal based on the time variation pattern in accordance with the first modulation scheme to the first dynamic electromagnetic-wave filter 5a to the third dynamic electromagnetic-wave filter 5c.

The first dynamic electromagnetic-wave filter 5a has fE1 (Hz) set as a filter frequency by the frequency setting signal from the control-signal output unit 4, randomly modifies the frequency fE1 (Hz) over time by the modulation signal from the control-signal output unit 4 with respect to the electromagnetic waves emitted from the device 200, and emits the modified wave as a randomly modified leaked electromagnetic wave.

The second dynamic electromagnetic-wave filter 5b has fE2 (Hz) set as the filter frequency by the frequency setting signal from the control-signal output unit 4, randomly modifies the frequency fE2 (Hz) over time by the modulation signal from the control-signal output unit 4 with respect to the electromagnetic waves emitted from the device 200, and emits the modified wave as a randomly modified leaked electromagnetic wave.

The third dynamic electromagnetic-wave filter 5c has fE3 (Hz) set as the filter frequency by the frequency setting signal from the control-signal output unit 4, randomly modifies the frequency fE3 (Hz) over time by the modulation signal from the control-signal output unit 4 with respect to the electromagnetic waves emitted from the device 200, and emits the modified wave as a randomly modified leaked electromagnetic wave.

With the first modulation scheme, the waveform of the leaked electromagnetic wave from the dynamic electromagnetic-wave filter 5 to which the electromagnetic waves including the image information emitted from the device 200 are input is randomly modulated, and the waveform of the electromagnetic waves including the image information emitted from the device 200 is modified.

By randomly modifying the waveform of the leaked electromagnetic wave in this manner, it is possible to prevent the eavesdropper from correctly reproducing the image information.

<Second Modulation Scheme>

A modulation scheme of modulating electromagnetic waves by repeating a pattern of periodically switching transmission characteristics of the dynamic electromagnetic-wave filter 5 in terms of time.

The transmission characteristic that is periodically switched in terms of time is mainly the transmission phase, but the transmission amplitude may also be changed.

With the second modulation scheme, the leaked electromagnetic wave including the image information is modulated as follows.

The waveform of the leaked electromagnetic wave repeatedly modulated in a periodic pattern is obtained as follows. The period of the periodic modulation pattern is denoted as Tm(s), and the modulation frequency is denoted as fm=1/Tm (Hz).

A complex transmission coefficient T(t) of the dynamic electromagnetic-wave filter 5 in this case is represented by a complex Fourier series represented by the following formula (1).

$$T(t) = \sum_{n=-\infty}^{\infty} C_n e^{j2\pi n f_m t} \qquad (1)$$

Here, the nth order coefficient of the series can be calculated by the following formula (2).

$$C_n = \frac{1}{T_m} \int_0^{T_m} T(t) e^{-j2\pi n f_m t} dt \qquad (2)$$

Therefore, a complex electric field Et(t) of the leaked electromagnetic wave when the electromagnetic wave with the frequency f (Hz) is input to the dynamic electromagnetic-wave filter 5 is represented by the following formula (3).

$$E_t(t) = \sum_{n=-\infty}^{\infty} C_n e^{j2\pi(f+nf_m)t} \qquad (3)$$

As a result, it can be seen that the leaked electromagnetic wave has a harmonic component of f+n·fm in addition to the component of the frequency f (Hz) by periodic modulation.

Note that the frequency of the harmonic having the harmonic component here is not a frequency corresponding to a harmonic of an integral multiple of the electromagnetic waves emitted from the device 200, but is a frequency obtained by adding a modulation frequency of an integral multiple to the frequency of the electromagnetic waves emitted from the device 200.

Numerical examples of the second modulation scheme and effects thereof will be described below.

Note that the following numerical examples are examples showing a periodic modulation method and its effect, and any modulation method using a combination of other periodic numerical values can be used. In either case, it is possible to prevent the eavesdropper from tuning the reception frequency of the eavesdropping device to the frequency of the leaked electromagnetic wave, from reproducing an image after reception, and from accumulating the reproduced image and improving the definition of the image by averaging.

First Numerical Example of Second Modulation Scheme

Figure 4:
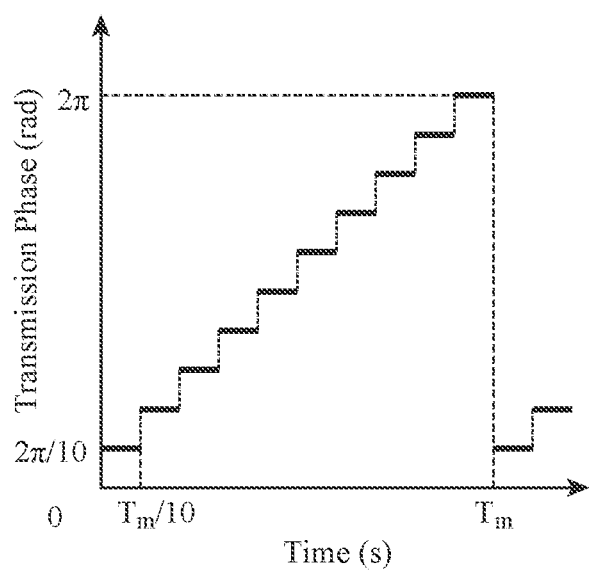
FIG. 4 is a diagram illustrating a relationship between time and a transmission phase for explaining a first numerical example of a second modulation scheme example in the information leakage prevention shield device according to the first embodiment.

As the first dynamic electromagnetic-wave filter 5*a* to the third dynamic electromagnetic-wave filter 5*c*, modulation is performed in which the transmission amplitude is set to a constant value of −50 dB and the transmission phase is increased by 2π/10 (rad) to 2π in ten steps as illustrated in FIG. 4 on the basis of the idea of the second modulation scheme.

In this case, the first numerical example of the second modulation scheme is a periodic pattern with a period of Tm (s).

In FIG. 4, the horizontal axis represents time, and the vertical axis represents a transmission phase.

Note that, in order to avoid complexity of description, the transmission amplitude is set to a constant value of −50 dB, but may be changed instead of a constant value such as −50 dB to −45 dB or −55 dB in each period.

When determining that the electromagnetic environment around the device 200 detected by the electromagnetic-wave detection unit 1, which is one factor for determining the modulation method, has a relatively high level of background noise, the modulation-signal generation unit 3 reads the first numerical example of the second modulation scheme stored in the storage unit 2, and generates a time variation pattern for sequentially instructing a plurality of different transmission phases over time by a pattern of repeating a pattern of increasing the transmission phase by 2π/10 (rad) to 2π in ten steps in the period Tm (s), which is the first numerical example of the second modulation scheme.

The control-signal output unit 4 outputs a modulation signal based on the time variation pattern in accordance with the first numerical example of the second modulation scheme to the first dynamic electromagnetic-wave filter 5*a* to the third dynamic electromagnetic-wave filter 5*c*.

The dynamic electromagnetic-wave filter 5 that has received the modulation signal from the control-signal output unit 4 emits the leaked electromagnetic wave having the amplitude calculated by the above formula (3).

Figure 5:
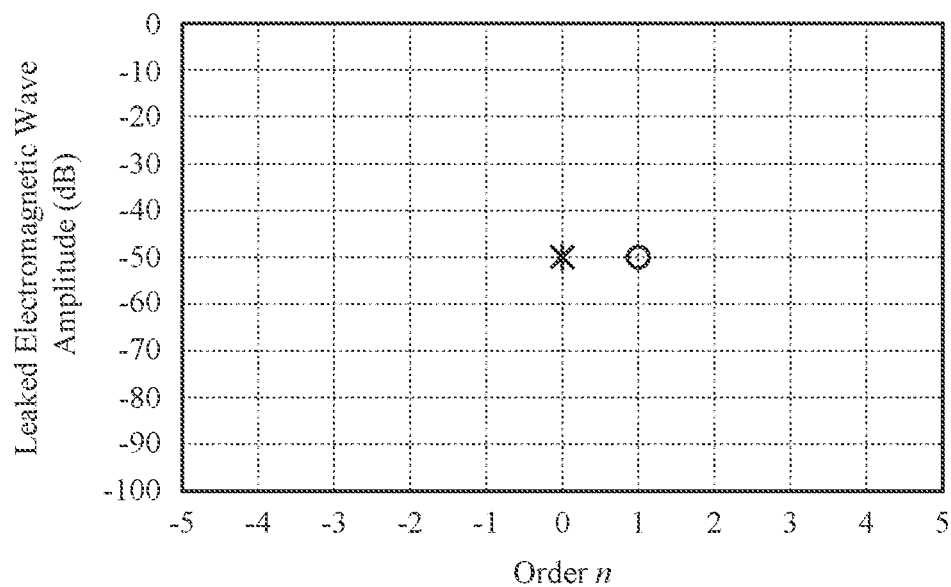
FIG. 5 is a diagram illustrating a calculation result of a relationship between a harmonic and a leaked electromagnetic wave amplitude for explaining the first numerical example of the second modulation scheme example in the information leakage prevention shield device according to the first embodiment.

FIG. 5 illustrates a calculation result of the amplitude of the leaked electromagnetic wave with the frequencies of ±fifth order harmonic components from the dynamic electromagnetic-wave filter 5.

In FIG. 5, the horizontal axis represents the order of harmonics, the vertical axis represents a leaked electromagnetic wave amplitude, the mark "○" represents a case where the first numerical example of the second modulation scheme is performed, and the mark "x" represents a comparative example in a case where modulation is not performed, that is, in a case where the transmission amplitude is set to a constant value of −50 dB, and the transmission phase is not changed, that is, the transmission phase is set to a constant value without modulation.

In the comparative example, there is only a zero harmonic, that is, a component with the same frequency f (Hz) as an incident wave.

On the other hand, when the dynamic electromagnetic-wave filter 5 is modulated by the second modulation scheme (first numerical example), the leaked electromagnetic wave from the dynamic electromagnetic-wave filter 5 has a first order harmonic, that is, a harmonic component with a frequency of f+fm (Hz), and the component of the frequency f (Hz) is suppressed.

Note that, in both the second modulation scheme and the comparative example, the transmission amplitude (the amplitude of the leaked electromagnetic wave) is about −50 dB.

Therefore, the first dynamic electromagnetic-wave filter 5*a* has fE1 (Hz) as the filter frequency set by the frequency setting signal from the control-signal output unit 4, suppresses the component of the frequency fE1 (Hz) with respect to the electromagnetic waves emitted from the device 200, and emits the leaked electromagnetic wave including the first order harmonic component of the frequency fE1+fm1 (Hz).

The second dynamic electromagnetic-wave filter 5*b* has fE2 (Hz) as the filter frequency set by the frequency setting signal from the control-signal output unit 4, suppresses the component of the frequency fE2 (Hz) with respect to the electromagnetic waves emitted from the device 200, and emits the leaked electromagnetic wave including the first order harmonic component of the frequency fE2+fm2 (Hz).

The third dynamic electromagnetic-wave filter 5*c* has fE3 (Hz) as the filter frequency set by the frequency setting signal from the control-signal output unit 4, suppresses the component of the frequency fE3 (Hz) with respect to the electromagnetic waves emitted from the device 200, and emits the leaked electromagnetic wave including the first order harmonic component of the frequency fE3+fm3 (Hz).

As described above, by performing the modulation of the second modulation scheme (first numerical example), the leaked electromagnetic wave including only the first order harmonic component of the frequency f+fm (Hz) is emitted from the dynamic electromagnetic-wave filter 5, and the electromagnetic wave emitted from the device 200 can be deceived by the leaked electromagnetic wave emitted from the dynamic electromagnetic-wave filter 5.

Therefore, by switching the control of the dynamic electromagnetic-wave filter 5 by the second modulation scheme (first numerical example) and the non-operation of the dynamic electromagnetic-wave filter 5, only one of the frequency f+fm (Hz) of the leaked electromagnetic wave from the dynamic electromagnetic wave-filter 5 and the frequency f (Hz) of the electromagnetic wave emitted from the device 200 is present depending on the time, and thus the eavesdropper cannot constantly tune to the frequency of the electromagnetic waves emitted from the device 200.

As a result, accumulation of image data necessary for averaging can be disturbed.

In addition, by varying the period Tm (s) as appropriate without fixing the period Tm (s), the frequency f+fm (Hz) can be varied and the accumulation of the image data necessary for averaging can be disturbed.

Second Numerical Example of Second Modulation Scheme

As the first dynamic electromagnetic-wave filter 5*a* to the third dynamic electromagnetic-wave filter 5*c*, modulation is performed in which the transmission amplitude is set to a constant value of −50 dB and the transmission phase is set to 2.5 sin(α(t)) (rad), and α(t) is increased by 2π/10 (rad) to 2π in ten steps as illustrated in FIG. 4 on the basis of the idea of the second modulation scheme.

In this case, the second numerical example of the second modulation scheme is a periodic pattern in terms of time.

Note that, in order to avoid complexity of description, the transmission amplitude is set to a constant value of −50 dB, but may be changed instead of a constant value such as −50 dB to −45 dB or −55 dB in each period.

When determining that the electromagnetic environment around the structure 400 detected by the electromagnetic-wave detection unit 1, which is one factor for determining the modulation method, has a relatively low level of background noise, the modulation-signal generation unit 3 reads the second numerical example of the second modulation scheme stored in the storage unit 2, and generates a time variation pattern for sequentially instructing a plurality of different transmission phases over time by a pattern of repeating a pattern of increasing α(t) by 2π/10 (rad) to 2π in ten steps while setting the transmission phase to 2.5 sin(α(t)) (rad), which is the second numerical example of the second modulation scheme.

The control-signal output unit 4 outputs a modulation signal based on the time variation pattern in accordance with the second numerical example of the second modulation scheme to the first dynamic electromagnetic-wave filter 5a to the third dynamic electromagnetic-wave filter 5c.

The dynamic electromagnetic-wave filter 5 that has received the modulation signal from the control-signal output unit 4 emits the leaked electromagnetic wave having the amplitude calculated by the above formula (3).

Figure 6:
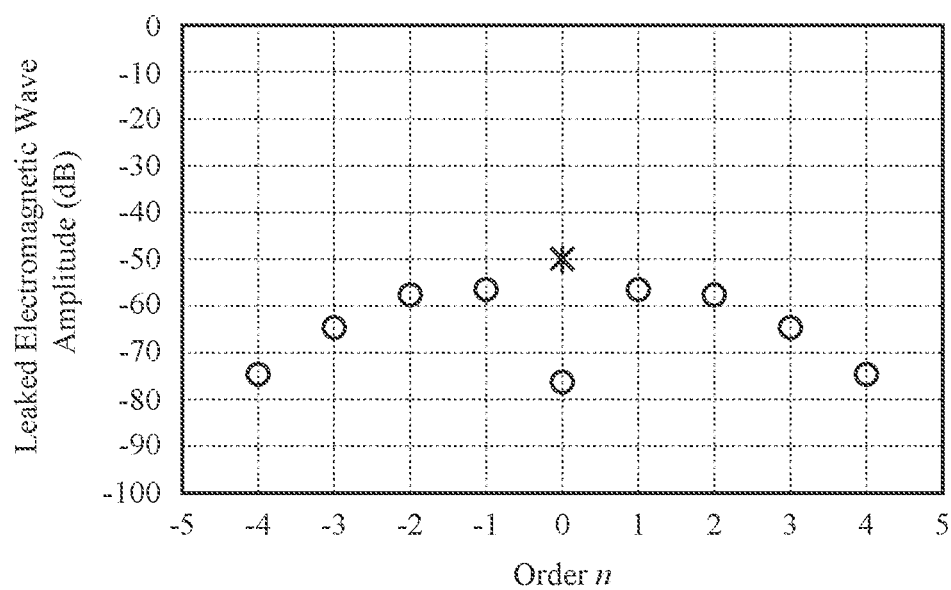
FIG. 6 is a diagram illustrating a leaked electromagnetic wave amplitude with respect to an order for explaining a second numerical example of the second modulation scheme example in the information leakage prevention shield device according to the first embodiment.

FIG. 6 illustrates a calculation result of the amplitude of the leaked electromagnetic wave with the frequencies of ±fifth order harmonic components from the dynamic electromagnetic-wave filter 5.

In FIG. 6, the horizontal axis represents the order of harmonics, the vertical axis represents a leaked electromagnetic wave amplitude, the mark "○" represents a case where the second numerical example of the second modulation scheme is performed, and the mark "x" represents a comparative example in a case where modulation is not performed.

When the dynamic electromagnetic-wave filter 5 is modulated by the second modulation scheme (second numerical example), the same frequency f (Hz) as the incident wave appearing in the leaked electromagnetic wave from the dynamic electromagnetic-wave filter 5 is suppressed by about −25 dB. The nth order harmonic component of the frequency f+n·fm (Hz) appearing in the leaked electromagnetic wave from the dynamic electromagnetic-wave filter 5 is suppressed by several dB or more.

Therefore, the first dynamic electromagnetic-wave filter 5a has fE1 (Hz) as the filter frequency set by the frequency setting signal from the control-signal output unit 4, suppresses the component of the frequency fE1 (Hz) by about −25 dB with respect to the electromagnetic waves emitted from the device 200, and emits the leaked electromagnetic wave in which the nth order harmonic component of the frequency fE1+n·fm1 (Hz) is suppressed by several dB or more.

The second dynamic electromagnetic-wave filter 5b has fE2 (Hz) as the filter frequency set by the frequency setting signal from the control-signal output unit 4, suppresses the component of the frequency fE2 (Hz) by about −25 dB with respect to the electromagnetic waves emitted from the device 200, and emits the leaked electromagnetic wave in which the nth order harmonic component of the frequency fE2+n·fm2 (Hz) is suppressed by several dB or more.

The third dynamic electromagnetic-wave filter 5c has fE3 (Hz) as the filter frequency set by the frequency setting signal from the control-signal output unit 4, suppresses the component of the frequency fE3 (Hz) by about −25 dB with respect to the electromagnetic waves emitted from the device 200, and emits the leaked electromagnetic wave in which the nth order harmonic component of the frequency fE3+n·fm3 (Hz) is suppressed by several dB or more.

As described above, by performing the modulation of the second modulation scheme (second numerical example), the same frequency f (Hz) as the incident wave in the leaked electromagnetic wave can be reduced, and the frequency f+n·fm (Hz) of each harmonic component is emitted as the leaked electromagnetic wave.

Therefore, by performing the modulation of the second modulation scheme (second numerical example), the relative amount of the background noise with respect to the leaked electromagnetic wave from the dynamic electromagnetic-wave filter 5 increases, and thus, it is possible to obtain an effect of lowering the definition of a reproduced image even in a case where the eavesdropper tunes to any frequency.

As a result, the accumulation of the image data necessary for averaging can be disturbed.

In addition, by switching the presence or absence of the second modulation scheme (second numerical example) or by varying the period Tm (s) in the second modulation scheme (second numerical example) as appropriate without fixing the period Tm (s), the frequency f (Hz) and the frequency f+n·fm (Hz) with respect to the leaked electromagnetic wave can be varied, and the accumulation of the image data necessary for averaging can be disturbed.

Third Numerical Example of Second Modulation Scheme

As the first dynamic electromagnetic-wave filter 5a to the third dynamic electromagnetic-wave filter 5c, modulation is performed in which the transmission amplitude is set to a constant value of −50 dB and the transmission phase is switched between two values, that is, 0 (rad) and π (rad) every period Tm/2 (s) on the basis of the idea of the second modulation scheme.

In this case, the third numerical example of the second modulation scheme is a periodic pattern with a period of Tm (s).

Note that, in order to avoid complexity of description, the transmission amplitude is set to a constant value of −50 dB, but may be changed instead of a constant value such as −50 dB to −45 dB or −55 dB in each period.

When determining that the electromagnetic environment around the structure 400 detected by the electromagnetic-wave detection unit 1, which is one factor for determining the modulation method, has a relatively low level of background noise, the modulation-signal generation unit 3 reads the third numerical example of the second modulation scheme stored in the storage unit 2, and generates a time variation pattern for sequentially instructing a plurality of different transmission phases over time by a pattern of switching the transmission phase between two values, that is, 0 (rad) and π (rad) every period Tm/2 (s), which is the third numerical example of the second modulation scheme.

The control-signal output unit 4 outputs a modulation signal based on the time variation pattern in accordance with the third numerical example of the second modulation scheme to the first dynamic electromagnetic-wave filter 5a to the third dynamic electromagnetic-wave filter 5c.

The dynamic electromagnetic-wave filter 5 that has received the modulation signal from the control-signal output unit 4 emits the leaked electromagnetic wave having the amplitude calculated by the above formula (3).

Figure 7:
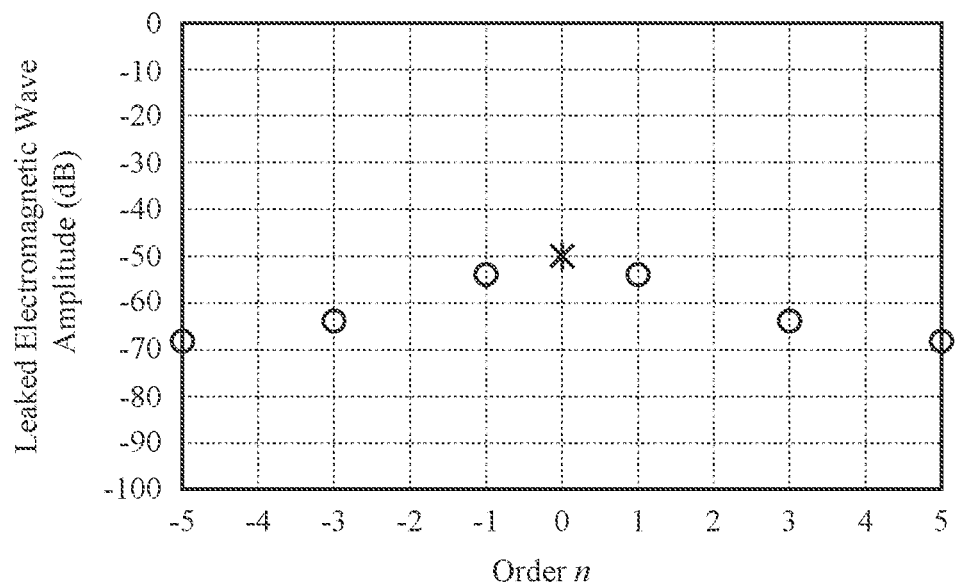
FIG. 7 is a diagram illustrating the leaked electromagnetic wave amplitude with respect to the order for explaining a third numerical example of the second modulation scheme example in the information leakage prevention shield device according to the first embodiment.

FIG. 7 illustrates a calculation result of the amplitude of the leaked electromagnetic wave with the frequencies of ±fifth order harmonic components from the dynamic electromagnetic-wave filter 5.

In FIG. 7, the horizontal axis represents the order of harmonics, the vertical axis represents a leaked electromagnetic wave amplitude, the mark "○" represents a case where the third numerical example of the second modulation scheme is performed, and the mark "x" represents a comparative example in a case where modulation is not performed.

When the dynamic electromagnetic-wave filter 5 is modulated by the second modulation scheme (third numerical example), in the leaked electromagnetic wave from the dynamic electromagnetic-wave filter 5, harmonic components with the same frequency f (Hz) as the incident wave and the even order frequency f+n·fm (Hz) (where n is an even number) are suppressed, and the harmonic component of the odd order frequency f+n·fm (Hz) (where n is an odd number) is suppressed by several dB or more.

Therefore, the first dynamic electromagnetic-wave filter 5a has fE1 (Hz) as the filter frequency set by the frequency setting signal from the control-signal output unit 4, suppresses the component of the frequency fE1 (Hz) and the harmonic component of the even order frequency fE1+n·fm1 (Hz) (where n is an even number) with respect to the electromagnetic waves emitted from the device 200, and emits the leaked electromagnetic wave in which the harmonic component of the odd order frequency fE1+n·fm1 (Hz) (where n is an odd number) is suppressed by several dB or more.

The second dynamic electromagnetic-wave filter 5b has fE2 (Hz) as the filter frequency set by the frequency setting signal from the control-signal output unit 4, suppresses the component of the frequency fE2 (Hz) and the harmonic component of the even order frequency fE2+n·fm2 (Hz) (where n is an even number) with respect to the electromagnetic waves emitted from the device 200, and emits the leaked electromagnetic wave in which the harmonic component of the odd order frequency fE2+n·fm2 (Hz) (where n is an odd number) is suppressed by several dB or more.

The third dynamic electromagnetic-wave filter 5c has fE3 (Hz) as the filter frequency set by the frequency setting signal from the control-signal output unit 4, suppresses the component of the frequency fE3 (Hz) and the harmonic component of the even order frequency fE3+n·fm3 (Hz) (where n is an even number) with respect to the electromagnetic waves emitted from the device 200, and emits the leaked electromagnetic wave in which the harmonic component of the odd order frequency fE3+n·fm3 (Hz) (where n is an odd number) is suppressed by several dB or more.

As described above, by performing the modulation of the second modulation scheme (third numerical example), the frequency f (Hz) and the even order frequency f+n·fm (Hz) (where n is an even number) are not included in the leaked electromagnetic wave from the dynamic electromagnetic-wave filter 5, and the odd order frequency f+n·fm (Hz) (where n is an odd number) is emitted.

Therefore, by performing the modulation of the second modulation scheme (third numerical example), it is difficult for the eavesdropper to specify the frequency to be tuned to the leaked electromagnetic wave.

As a result, it is possible to disturb the tuning to the frequency of the leaked electromagnetic wave and to disturb the accumulation of the image data necessary for averaging.

<Third Modulation Scheme>

A modulation scheme of modulating a plurality of dynamic electromagnetic-wave filters 5 in conjunction with each other in the information leakage prevention shield device 100 including the plurality of dynamic electromagnetic-wave filters 5.

In the modulation scheme, different filter frequencies are set in the plurality of dynamic electromagnetic-wave filters 5, and modulation is performed by either the first modulation scheme or the second modulation scheme, and the modulation allows frequencies of harmonic components after modulation to be equal to each other.

The modulation-signal generation unit 3 determines different filter frequencies for the first dynamic electromagnetic-wave filter 5a to the third dynamic electromagnetic-wave filter 5c, makes a determination on the basis of factors for determining a modulation method, for example, reads the first numerical example of the second modulation scheme from the storage unit 2, and generates a time variation pattern.

The control-signal output unit 4 outputs a frequency setting signal for setting a filter frequency and a modulation signal based on the time variation pattern in accordance with the first numerical example of the second modulation scheme to the first dynamic electromagnetic-wave filter 5a to the third dynamic electromagnetic-wave filter 5c.

The first dynamic electromagnetic-wave filter 5a has the frequency fE1 (Hz) of the electromagnetic waves emitted from the device 200 set as the filter frequency, suppresses the component of the frequency fE1 (Hz) with respect to the electromagnetic waves emitted from the device 200, and emits the leaked electromagnetic wave formed by the first order harmonic component having the frequency fE1+fm1 (Hz) obtained by adding the modulation frequency fm1 (Hz) to the filter frequency fE1 (Hz), as described in the first numerical example of the second modulation scheme.

The second dynamic electromagnetic-wave filter 5b has the frequency fE2 (Hz) of the electromagnetic waves emitted from the device 200 set as the filter frequency, suppresses the component of the frequency fE2 (Hz) with respect to the electromagnetic waves emitted from the device 200, and emits the leaked electromagnetic wave formed by the first order harmonic component having the frequency fE2+fm2 (Hz) obtained by adding the modulation frequency fm2 (Hz) to the filter frequency fE2 (Hz), as described in the first numerical example of the second modulation scheme.

The third dynamic electromagnetic-wave filter 5c has the frequency fE3 (Hz) of the electromagnetic waves emitted from the device 200 set as the filter frequency, suppresses the component of the frequency fE3 (Hz) with respect to the electromagnetic waves emitted from the device 200, and emits the leaked electromagnetic wave formed by the first order harmonic component having the frequency fE3+fm3 (Hz) obtained by adding the modulation frequency fm3 (Hz) to the filter frequency fE3 (Hz), as described in the first numerical example of the second modulation scheme.

Here, the modulation frequency fm1 (Hz) of the first dynamic electromagnetic-wave filter 5a, the modulation frequency fm2 (Hz) of the second dynamic electromagnetic-wave filter 5b, and the modulation frequency fm3 (Hz) of the third dynamic electromagnetic-wave filter 5c are set in such a manner that the frequency fE1+fm1 (Hz) of the modulated leaked electromagnetic wave from the first dynamic electromagnetic-wave filter 5a, the frequency fE2+fm2 (Hz) of the modulated leaked electromagnetic wave from the second dynamic electromagnetic-wave filter 5b, and the frequency fE3+fm3 (Hz) of the modulated leaked electromagnetic wave from the third dynamic electromagnetic-wave filter 5c have the same value.

By performing the third modulation scheme as described above, since the frequencies of the leaked electromagnetic waves from the first dynamic electromagnetic-wave filter 5a to the third dynamic electromagnetic-wave filter 5c have the same value, there is only one frequency of the modulated leaked electromagnetic wave with respect to the frequencies fE1 (Hz) to fE3 (Hz) of three electromagnetic waves.

Therefore, by performing the modulation of the third modulation scheme, it is difficult for the eavesdropper to specify the frequency to be tuned to the leaked electromagnetic wave.

As a result, it is possible to disturb the tuning to the frequency of the leaked electromagnetic wave and to disturb the accumulation of the image data necessary for averaging.

Note that the number of the dynamic electromagnetic-wave filters 5 is not limited to three, and may be two or be equal to or more than four, in short, it is only required that a plurality of the dynamic electromagnetic-wave filters 5 are used.

<Fourth Modulation Scheme>

A modulation scheme in which in the dynamic electromagnetic-wave filter 5 having a plurality of cells, the plurality of cells are classified into a plurality of groups, each group is a dynamic electromagnetic-wave filter unit having a plurality of cells, and the plurality of dynamic electromagnetic-wave filter units are individually modulated by different modulation schemes.

That is, the modulation scheme is different depending on the position on the dynamic electromagnetic-wave filter 5.

As an example, modulation is performed on the plurality of dynamic electromagnetic-wave filter units in the dynamic electromagnetic-wave filter 5 using the first numerical example of the second modulation scheme, and the periods Tm (s) of modulation patterns for the plurality of dynamic electromagnetic-wave filter units in the dynamic electromagnetic-wave filter 5 are made different from each other.

That is, the modulation-signal generation unit 3 makes a determination on the basis of the factor for determining the modulation method, for example, reads the first numerical example of the second modulation scheme from the storage unit 2, and generates a time variation pattern in which the periods Tm (s) of the modulation pattern are different for the plurality of dynamic electromagnetic-wave filter units in the dynamic electromagnetic-wave filter 5.

Since the operations of the plurality of dynamic electromagnetic-wave filter units in the dynamic electromagnetic-wave filter 5 are similar to those described in the first numerical example of the second modulation scheme, the description thereof is omitted.

By performing the fourth modulation scheme in this manner, the modulation scheme varies depending on the position on the dynamic electromagnetic-wave filter 5, and the frequency of the leaked electromagnetic wave varies depending on the point where the leaked electromagnetic wave from the dynamic electromagnetic-wave filter 5 is received.

Therefore, by performing the fourth modulation scheme, in addition to the difficulty of tuning to a leakage frequency due to the modulation of the second modulation scheme (first numerical example), even if the eavesdropper attempts eavesdropping while moving or attempts eavesdropping by installing a plurality of eavesdropping devices at different points, the frequency of the leaked electromagnetic wave varies depending on the receiving point, and thus it is necessary to repeat tuning every time the eavesdropper moves or for each eavesdropping device.

As a result, the accumulation of the image data necessary for averaging can be disturbed.

<Modification of Fourth Modulation Scheme>

A modulation scheme in which in the dynamic electromagnetic-wave filter 5 having a plurality of cells, the plurality of cells are classified into a plurality of groups, each group is a dynamic electromagnetic-wave filter unit having a plurality of cells, and the beam scanning technique known as phased array is applied to each of the plurality of dynamic electromagnetic-wave filter units.

That is, the modulation scheme is a modulation scheme in which by the individual dynamic electromagnetic-wave filter units performing modulation at a modulation timing with an appropriate time shift, the emission direction of the leaked electromagnetic wave is controlled or a timing when the leaked electromagnetic wave is not radiated at all in a specific direction is provided.

The modulation-signal generation unit 3 generates a time variation pattern based on a modulation scheme in which the beam scanning technique known as phased array is applied to the plurality of dynamic electromagnetic-wave filter units in the dynamic electromagnetic-wave filter 5.

The control-signal output unit 4 outputs a modulation signal based on the time variation pattern in accordance with the modulation scheme to which the beam scanning technique is applied to the plurality of dynamic electromagnetic-wave filter units of each of the first dynamic electromagnetic-wave filter 5a to the third dynamic electromagnetic-wave filter 5c.

Each of the plurality of dynamic electromagnetic-wave filter units of the dynamic electromagnetic-wave filter 5 performs modulation by the modulation scheme to which the beam scanning technique is applied and emits a leaked electromagnetic wave.

As described above, by performing modulation with a time shift depending on the position on the dynamic electromagnetic-wave filter 5, if the leaked electromagnetic wave cannot be received depending on the point where the leaked electromagnetic wave from the dynamic electromagnetic-wave filter 5 is received, the direction in which the leaked electromagnetic wave is received is completely different.

Therefore, by performing the modulation according to the modification of the fourth modulation scheme, it is difficult to tune the leaked electromagnetic wave regardless of the presence or absence of movement of the eavesdropper and the number of locations where the eavesdropping device is installed.

As a result, the accumulation of the image data necessary for averaging can be disturbed.

<Fifth Modulation Scheme>

A modulation scheme in which the modulation scheme is not fixed to one modulation scheme of the first modulation scheme, the second modulation scheme (first to third numerical examples), the third modulation scheme, and the fourth modulation scheme (including a modification) described above, and at least two modulation schemes among the plurality of modulation schemes are selected and sequentially repeated to modulate the dynamic electromagnetic-wave filter 5.

As described above, by performing modulation using different modulation schemes, the frequency of the modulated leaked electromagnetic wave from the dynamic electromagnetic-wave filter 5 is different for each modulation scheme.

Therefore, by performing the modulation of the fifth modulation scheme, it is difficult for the eavesdropper to take a measure corresponding to the modulation scheme every time the modulation scheme is switched, and it is difficult for the eavesdropper to specify the frequency that is tuned to the leaked electromagnetic wave.

As a result, it is possible to disturb the tuning to the frequency of the leaked electromagnetic wave and to disturb the accumulation of the image data necessary for averaging.

Second Embodiment

An information leakage prevention shield device 100 according to a second embodiment will be described with reference to FIG. 8.

The information leakage prevention shield device 100 according to the second embodiment is different from the information leakage prevention shield device 100 according to the first embodiment in that a first interfering-wave generation device 6 is added, and is similar to the information leakage prevention shield device 100 according to the first embodiment in other points.

Figure 8:
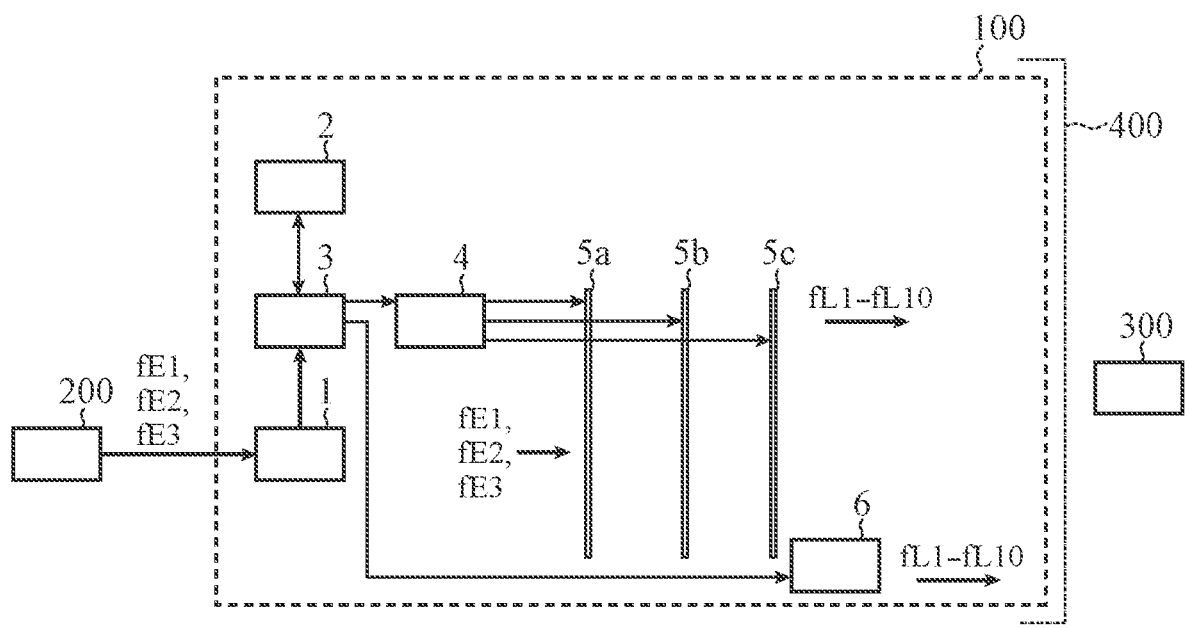
FIG. 8 is a configuration diagram illustrating an information leakage prevention shield device according to a second embodiment.

In FIG. 8, the same reference numerals as those in FIG. 2 denote the same or corresponding parts.

Since the information leakage prevention shield device 100 according to the second embodiment has the same configuration as the information leakage prevention shield device 100 according to the first embodiment except for the first interfering-wave generation device 6, the description thereof is omitted, and the first interfering-wave generation device 6 is mainly described.

The information leakage prevention shield device 100 according to the second embodiment enhances the information leakage prevention effect by intentionally superimposing the interfering electromagnetic wave from the first interfering-wave generation device 6 on the leaked electromagnetic wave from the first dynamic electromagnetic-wave filter 5a to the third dynamic electromagnetic-wave filter 5c. The first interfering-wave generation device 6 is a device that emits radio waves and includes a radiating element such as an antenna.

The first interfering-wave generation device 6 is disposed on a side closer to the eavesdropping device 300 than the first dynamic electromagnetic-wave filter 5a to the third dynamic electromagnetic-wave filter 5c, that is, on a side opposite to a side on which the device 200 is disposed with respect to the first dynamic electromagnetic-wave filter 5a to the third dynamic electromagnetic-wave filter 5c.

That is, the first interfering-wave generation device 6 is installed closer to the outside of the structure 400 than the first dynamic electromagnetic-wave filter 5a to the third dynamic electromagnetic-wave filter 5c, or installed outside the structure 400.

The first interfering-wave generation device 6 receives the filter frequency of each of the first dynamic electromagnetic-wave filter 5a to the third dynamic electromagnetic-wave filter 5c and the time variation pattern representing the modulation method for each of the first dynamic electromagnetic-wave filter 5a to the third dynamic electromagnetic-wave filter 5c, which are determined by the modulation-signal generation unit 3, and emits an interfering electromagnetic wave having a frequency equal to the frequency of the leaked electromagnetic wave emitted from each of the first dynamic electromagnetic-wave filter 5a to the third dynamic electromagnetic-wave filter 5c.

For example, when the leaked electromagnetic wave emitted from the first dynamic electromagnetic-wave filter 5a to the third dynamic electromagnetic-wave filter 5c has harmonic components of frequencies fL1 (Hz) to fL10 (Hz), the frequency of the interfering electromagnetic wave from the first interfering-wave generation device 6 is fL1 (Hz) to fL10 (Hz).

The harmonic components of the frequencies fL1 (Hz) to fL10 (Hz) in the leaked electromagnetic wave emitted from the first dynamic electromagnetic-wave filter 5a to the third dynamic electromagnetic-wave filter 5c include the frequency fE1+fm1 (Hz), the frequency fE2+fm2 (Hz), and the frequency fE3+fm3 (Hz) in a case where the first dynamic electromagnetic-wave filter 5a to the third dynamic electromagnetic-wave filter 5c are modulated with the first numerical example of the second modulation scheme, include the frequency fE1+n·fm1 (Hz), the frequency fE2+n·fm2 (Hz), and the frequency fE3+n·fm3 (Hz) in a case where the first dynamic electromagnetic-wave filter 5a to the third dynamic electromagnetic-wave filter 5c are modulated with the second numerical example of the second modulation scheme, and include the odd order frequency fE1+n·fm1 (Hz) (where n is an odd number), the odd order frequency fE2+n·fm2 (Hz) (where n is an odd number), and the odd-order frequency fE3+n·fm3 (Hz) (where n is an odd number) in a case where the first dynamic electromagnetic-wave filter 5a to the third dynamic electromagnetic-wave filter 5c are modulated with the third numerical example of the second modulation scheme.

Next, an operation of the information leakage prevention shield device 100 will be described.

Similarly to the operation of the information leakage prevention shield device 100 according to the first embodiment, the modulation-signal generation unit 3 determines the filter frequency for the first dynamic electromagnetic-wave filter 5a to the third dynamic electromagnetic-wave filter 5c, and generates a time variation pattern based on the selected modulation scheme.

The control-signal output unit 4 outputs a frequency setting signal for setting a filter frequency and a modulation signal based on the selected modulation scheme to the first dynamic electromagnetic-wave filter 5a to the third dynamic electromagnetic-wave filter 5c.

In the first dynamic electromagnetic-wave filter 5a to the third dynamic electromagnetic-wave filter 5c, the filter frequency is set by the frequency setting signal, the transmission phase is switched over time by the modulation signal, and the leaked electromagnetic wave having the harmonic components of the frequencies fL1 (Hz) to fL10 (Hz) is emitted.

On the other hand, the first interfering-wave generation device 6 receives the filter frequency of each of the first dynamic electromagnetic-wave filter 5a to the third dynamic electromagnetic-wave filter 5c and the time variation pattern representing the modulation method for each of the first dynamic electromagnetic-wave filter 5a to the third dynamic electromagnetic-wave filter 5c, which are determined by the modulation-signal generation unit 3, and emits an interfering electromagnetic wave with frequencies fL1 (Hz) to fL10 (Hz) equal to the frequencies of the leaked electromagnetic wave emitted from each of the first dynamic electromagnetic-wave filter 5a to the third dynamic electromagnetic-wave filter 5c.

As a result, the interfering electromagnetic wave with the frequencies fL1 (Hz) to fL10 (Hz) from the first interfering-wave generation device 6 is superimposed on the leaked electromagnetic wave having the harmonic components of the frequencies fL1 (Hz) to fL10 (Hz) emitted from the first dynamic electromagnetic-wave filter 5a to the third dynamic electromagnetic-wave filter 5c.

Therefore, it is difficult for the eavesdropper to specify the frequency to be tuned to the leaked electromagnetic wave.

As a result, it is possible to disturb the tuning to the frequency of the leaked electromagnetic wave and to disturb the accumulation of the image data necessary for averaging.

In addition, by limiting the frequency at which the interfering electromagnetic wave is emitted to the frequency of the leaked electromagnetic wave, the power required for the first interfering-wave generation device 6 to emit the interfering electromagnetic wave can be reduced, and the possibility that the interfering electromagnetic wave from the first interfering-wave generation device 6 wirelessly interferes with another device can be reduced.

Note that the first interfering-wave generation device 6 emits interfering electromagnetic waves with frequencies equal to all the frequencies of the leaked electromagnetic waves emitted from the first dynamic electromagnetic-wave filter 5*a* to the third dynamic electromagnetic-wave filter 5*c*, but may emit interfering electromagnetic waves with frequencies equal to a part of the frequencies of the leaked electromagnetic waves emitted from the first dynamic electromagnetic-wave filter 5*a* to the third dynamic electromagnetic-wave filter 5*c*.

Third Embodiment

An information leakage prevention shield device 100 according to a third embodiment will be described with reference to FIG. 9.

The information leakage prevention shield device 100 according to the third embodiment is different from the information leakage prevention shield device 100 according to the first embodiment in that a second interfering-wave generation device 7 is added, and is similar to the information leakage prevention shield device 100 according to the first embodiment in other points.

Figure 9:
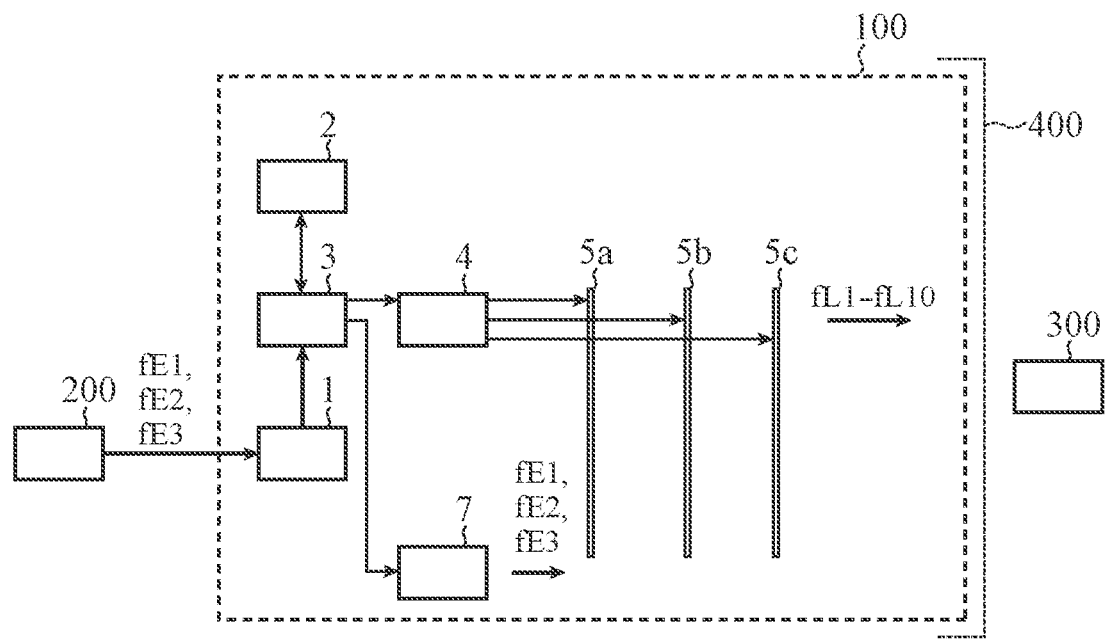
FIG. 9 is a configuration diagram illustrating an information leakage prevention shield device according to a third embodiment.

In FIG. 9, the same reference numerals as those in FIG. 2 denote the same or corresponding parts.

Since the information leakage prevention shield device 100 according to the third embodiment has the same configuration as the information leakage prevention shield device 100 according to the first embodiment except for the second interfering-wave generation device 7, the description thereof is omitted, and the second interfering-wave generation device 7 is mainly described.

The information leakage prevention shield device 100 according to the third embodiment enhances the information leakage prevention effect by intentionally superimposing the interfering electromagnetic wave from the second interfering-wave generation device 7 on the electromagnetic waves emitted from the device 200 to the first dynamic electromagnetic-wave filter 5*a* to the third dynamic electromagnetic-wave filter 5*c*.

The second interfering-wave generation device 7 is a device that emits radio waves and includes a radiating element such as an antenna.

The second interfering-wave generation device 7 is disposed on a side farther from the eavesdropping device 300 than the first dynamic electromagnetic-wave filter 5*a* to the third dynamic electromagnetic-wave filter 5*c*, that is, on a side closer to the side on which the device 200 is disposed than the first dynamic electromagnetic-wave filter 5*a* to the third dynamic electromagnetic-wave filter 5*c*.

That is, the second interfering-wave generation device 7 is installed closer to the inside of the structure 400 than the first dynamic electromagnetic-wave filter 5*a* to the third dynamic electromagnetic-wave filter 5*c*, or installed inside the structure 400.

The second interfering-wave generation device 7 receives the filter frequencies of the first dynamic electromagnetic-wave filter 5*a* to the third dynamic electromagnetic-wave filter 5*c* determined by the modulation-signal generation unit 3, that is, the frequency fE1 (Hz), the frequency fE2 (Hz), and the frequency fE3 (Hz) of the electromagnetic waves emitted from the device 200, and emits interfering electromagnetic waves with frequencies equal to the frequency fE1 (Hz), the frequency fE2 (Hz), and the frequency fE3 (Hz).

Next, an operation of the information leakage prevention shield device 100 will be described.

The interfering electromagnetic waves of the frequency fE1 (Hz), the frequency fE2 (Hz), and the frequency fE3 (Hz) emitted from the second interfering-wave generation device 7 are superimposed on the electromagnetic waves of the frequency fE1 (Hz), the frequency fE2 (Hz), and the frequency fE3 (Hz) emitted from the device 200, and then are input to the first dynamic electromagnetic-wave filter 5*a* to the third dynamic electromagnetic-wave filter 5*c*.

Similarly to the operation of the information leakage prevention shield device 100 according to the first embodiment, the modulation-signal generation unit 3 determines the filter frequency for the first dynamic electromagnetic-wave filter 5*a* to the third dynamic electromagnetic-wave filter 5*c*, and generates a time variation pattern based on the selected modulation scheme.

The control-signal output unit 4 outputs a frequency setting signal for setting a filter frequency and a modulation signal based on the selected modulation scheme to the first dynamic electromagnetic-wave filter 5*a* to the third dynamic electromagnetic-wave filter 5*c*.

In the first dynamic electromagnetic-wave filter 5*a* to the third dynamic electromagnetic-wave filter 5*c*, the filter frequency is set by the frequency setting signal, the transmission phase is switched over time by the modulation signal, the electromagnetic wave in which the interfering electromagnetic wave emitted from the second interfering-wave generation device 7 is superimposed on the electromagnetic waves emitted from the device 200 is modulated, and the leaked electromagnetic wave having the harmonic components of the frequencies fL1 (Hz) to fL10 (Hz) is emitted.

As a result, in the leaked electromagnetic wave having the harmonic components of the frequencies fL1 (Hz) to fL10 (Hz) from the first dynamic electromagnetic-wave filter 5*a* to the third dynamic electromagnetic-wave filter 5*c*, the leaked electromagnetic wave due to the interfering electromagnetic wave emitted from the second interfering-wave generation device 7 is superimposed on the leaked electromagnetic wave due to the electromagnetic waves emitted from the device 200.

Therefore, it is difficult for the eavesdropper to specify the frequency to be tuned to the leaked electromagnetic wave.

As a result, it is possible to disturb the tuning to the frequency of the leaked electromagnetic wave and to disturb the accumulation of the image data necessary for averaging.

In addition, by limiting the interfering electromagnetic wave to the frequency at which the electromagnetic wave is emitted from the device 200, the power required for the second interfering-wave generation device 7 to emit the interfering electromagnetic wave can be reduced, and the possibility that the interfering electromagnetic wave from the second interfering-wave generation device 7 wirelessly interferes with another device can be reduced.

In a case where the modulation in the first dynamic electromagnetic-wave filter 5a to the third dynamic electromagnetic-wave filter 5c is performed on the basis of the first and second numerical examples of the second modulation scheme, and the leaked electromagnetic waves from the first dynamic electromagnetic-wave filter 5a to the third dynamic electromagnetic-wave filter 5c are diffused with an nth order harmonic component, the number and amplitude of the harmonic components are large, and the interference of tuning to the frequency of the leaked electromagnetic wave becomes larger.

As described above, even if the number of frequencies of the leaked electromagnetic waves from the first dynamic electromagnetic-wave filter 5a to the third dynamic electromagnetic-wave filter 5c is increased, the frequency of the interfering electromagnetic wave from the second interfering-wave generation device 7 may be the frequency of the electromagnetic wave emitted from the device 200, so that a simple radio wave generator can be used as the second interfering-wave generation device 7.

Note that the second interfering-wave generation device 7 emits interfering electromagnetic waves with frequencies equal to all the frequencies of the electromagnetic waves emitted from the device 200, but may emit interfering electromagnetic waves with frequencies equal to a part of the frequencies of the electromagnetic waves emitted from the device 200.

Fourth Embodiment

An information leakage prevention shield device 100 according to a fourth embodiment will be described with reference to FIG. 10.

The information leakage prevention shield device 100 according to the fourth embodiment is different from the information leakage prevention shield device 100 according to the first embodiment in that a third interfering-wave generation device 8 and an interfering-wave dynamic electromagnetic-wave filter 5d are added, and is similar to the information leakage prevention shield device 100 according to the first embodiment in other points.

Figure 10:
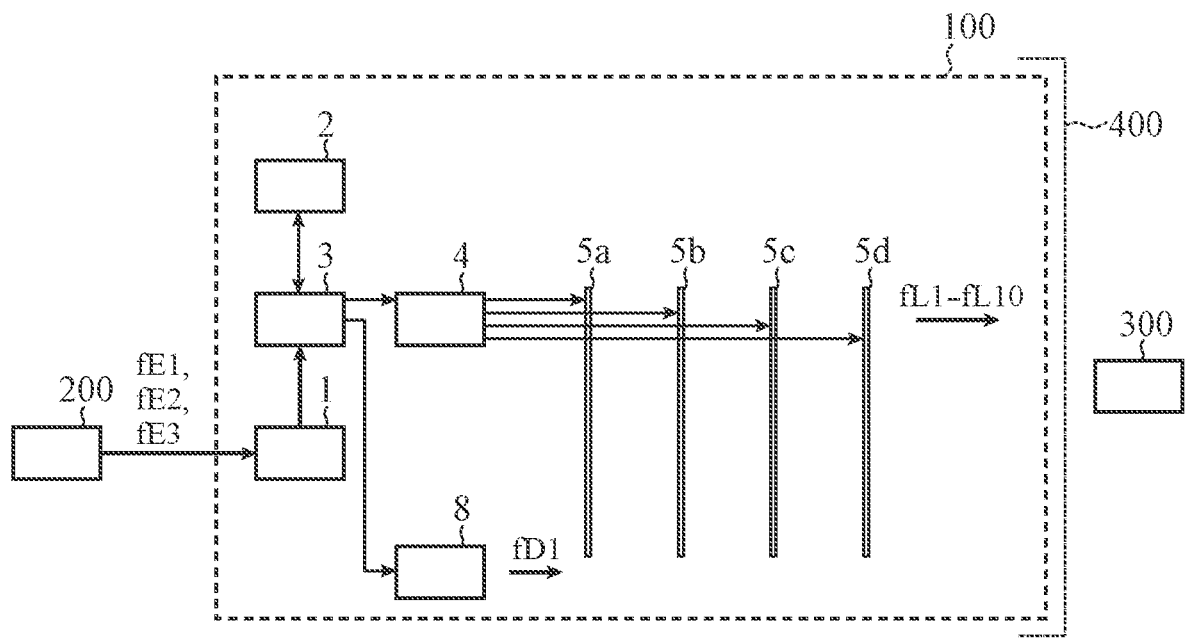
FIG. 10 is a configuration diagram illustrating an information leakage prevention shield device according to a fourth embodiment.

In FIG. 10, the same reference numerals as those in FIG. 2 denote the same or corresponding parts.

Since the information leakage prevention shield device 100 according to the fourth embodiment has the same configuration as the information leakage prevention shield device 100 according to the first embodiment except for the third interfering-wave generation device 8 and the interfering-wave dynamic electromagnetic-wave filter 5d, the description thereof is omitted, and the third interfering-wave generation device 8 and the interfering-wave dynamic electromagnetic-wave filter 5d are mainly described.

The information leakage prevention shield device 100 according to the fourth embodiment enhances the information leakage prevention effect by intentionally superimposing the leaked electromagnetic wave by the third interfering-wave generation device 8 and the interfering-wave dynamic electromagnetic-wave filter 5d on the leaked electromagnetic wave from the first dynamic electromagnetic-wave filter 5a to the third dynamic electromagnetic-wave filter 5c.

The third interfering-wave generation device 8 is a device that emits radio waves and includes a radiating element such as an antenna.

The third interfering-wave generation device 8 is disposed on a side farther from the eavesdropping device 300 than the first dynamic electromagnetic-wave filter 5a to the third dynamic electromagnetic-wave filter 5c, that is, on a side closer to the side on which the device 200 is disposed than the first dynamic electromagnetic-wave filter 5a to the third dynamic electromagnetic-wave filter 5c.

That is, the third interfering-wave generation device 8 is installed closer to the inside of the structure 400 than the first dynamic electromagnetic-wave filter 5a to the third dynamic electromagnetic-wave filter 5c, or installed inside the structure 400.

The third interfering-wave generation device 8 emits an interfering electromagnetic wave of a frequency fD1 different from the filter frequency of each of the first dynamic electromagnetic-wave filter 5a to the third dynamic electromagnetic-wave filter 5c determined by the modulation-signal generation unit 3, that is, the frequency of the electromagnetic waves emitted from the device 200.

The frequency fD1 is selected from frequencies that are not attenuated and modulated by the first dynamic electromagnetic-wave filter 5a to the third dynamic electromagnetic-wave filter 5c and are transmitted.

The interfering-wave dynamic electromagnetic-wave filter 5d operates with the frequency fD1 of the interfering electromagnetic wave from the third interfering-wave generation device 8 as a filter frequency.

The interfering-wave dynamic electromagnetic-wave filter 5d has the same configuration as the first dynamic electromagnetic-wave filter 5a to the third dynamic electromagnetic-wave filter 5c.

The interfering-wave dynamic electromagnetic-wave filter 5d is disposed in parallel with the first dynamic electromagnetic-wave filter 5a to the third dynamic electromagnetic-wave filter 5c. The interfering-wave dynamic electromagnetic-wave filter 5d may be sequentially brought into contact with the first dynamic electromagnetic-wave filter 5a to the third dynamic electromagnetic-wave filter 5c to be integrated.

In the interfering-wave dynamic electromagnetic-wave filter 5d, the filter frequency is set to the frequency fD1 by the frequency setting signal output from the control-signal output unit 4 at the frequency fD1 determined by the modulation-signal generation unit 3, and the interfering electromagnetic wave from the third interfering-wave generation device 8 is modulated by an interfering modulation signal based on the time variation pattern in accordance with the modulation scheme generated by the modulation-signal generation unit 3 to emit the interfering leaked electromagnetic wave.

The modulation scheme for the interfering modulation signal is a modulation scheme in which the interfering electromagnetic wave is not attenuated, that is, the transmission amplitude is 0 dB, the transmission phase is switched, and the frequency of the interfering leaked electromagnetic wave emitted from the interfering-wave dynamic electromagnetic-wave filter 5d is the same as a part or all of the frequencies of the leaked electromagnetic waves of the first dynamic electromagnetic-wave filter 5a to the third dynamic electromagnetic-wave filter 5c.

As a result, the leaked electromagnetic wave with the frequencies fL1 (Hz) to fL10 (Hz) from the interfering-wave dynamic electromagnetic-wave filter 5d is superimposed on the leaked electromagnetic wave having harmonic components of the frequencies fL1 (Hz) to fL10 (Hz) emitted from the first dynamic electromagnetic-wave filter 5a to the third dynamic electromagnetic-wave filter 5c.

Therefore, it is difficult for the eavesdropper to specify the frequency to be tuned to the leaked electromagnetic wave.

As a result, it is possible to disturb the tuning to the frequency of the leaked electromagnetic wave and to disturb the accumulation of the image data necessary for averaging.

In addition, since the single frequency fD1 of the interfering electromagnetic wave emitted from the third interfering-wave generation device 8 may be used, a simple radio-wave generation device can be used as the third interfering-wave generation device 8.

Furthermore, since the frequency fD1 of the interfering electromagnetic wave emitted from the third interfering-wave generation device 8 is set to a frequency that is transmitted without being attenuated and modulated by the first dynamic electromagnetic-wave filter 5a to the third dynamic electromagnetic-wave filter 5c, the output from the third interfering-wave generation device 8 can be reduced, and the power consumption required for the emission of the interfering electromagnetic wave in the third interfering-wave generation device 8 can be reduced.

Note that it is possible to freely combine the embodiments, modify any component of each embodiment, or omit any component of each embodiment.

INDUSTRIAL APPLICABILITY

The information leakage prevention shield device 100 according to the present disclosure is applied to an information leakage prevention device for a device in which information may be intercepted from emitted electromagnetic waves, or a device that intentionally or unintentionally emits electromagnetic waves such as a device, a monitor, a wireless communication device, or a printer.

REFERENCE SIGNS LIST

100: information leakage prevention shield device, 200: device, 300: eavesdropping device, 400: structure, 1: electromagnetic-wave detection unit, 2: storage unit, 3: modulation-signal generation unit, 4: signal output unit, 5a to 5c: first dynamic electromagnetic-wave filter to third dynamic electromagnetic-wave filter, 6: first interfering-wave generation device, 7: second interfering-wave generation device, 8: third interfering-wave generation device

The invention claimed is:

1. An information leakage prevention shield device comprising:
a controller to output a frequency setting signal for setting a filter frequency for an electromagnetic wave emitted from a device, and a modulation signal based on a time variation pattern for sequentially instructing a plurality of different transmission characteristics over time; and
at least one dynamic electromagnetic-wave filter having the filter frequency set by the frequency setting signal from the controller, having the plurality of different transmission characteristics over time set by the modulation signal from the controller, to transmit an electromagnetic wave other than the filter frequency set by the frequency setting signal, and to have the plurality of different transmission characteristics over time set by the modulation signal with respect to the filter frequency set by the frequency setting signal.

2. The information leakage prevention shield device according to claim 1, wherein the time variation pattern is formed by randomly switching a transmission characteristic in terms of time.

3. The information leakage prevention shield device according to claim 1, wherein in the time variation pattern, a transmission characteristic is increased by $2\pi/10$ (rad) to $2\pi$ in ten steps.

4. The information leakage prevention shield device according to claim 1, wherein in the time variation pattern, a transmission characteristic is 2.5 $\sin(\alpha(t))$ (rad) and $\alpha(t)$ is increased by $2\pi/10$ (rad) to $2\pi$ in ten steps.

5. The information leakage prevention shield device according to claim 1, wherein in the time variation pattern, a transmission characteristic is switched between two values of 0 (rad) and $\pi$ (rad).

6. The information leakage prevention shield device according to claim 1, wherein the controller outputs the modulation signal including a plurality of time variation patterns in which the time variation pattern is repeated a plurality of times, and the plurality of time variation patterns is based on a same modulation scheme.

7. The information leakage prevention shield device according to claim 1, wherein the controller outputs the modulation signal including a plurality of time variation patterns in which the time variation pattern is repeated a plurality of times, and the plurality of time variation patterns includes different time variation patterns.

8. The information leakage prevention shield device according to claim 1, wherein
the at least one dynamic electromagnetic-wave filter includes a plurality of cells arranged in a matrix of a plurality of rows and a plurality of columns, the plurality of cells are classified into a plurality of groups, and each of the plurality of groups is a dynamic electromagnetic-wave filter group including a plurality of cells, and
the controller outputs a modulation signal based on respectively different time variation patterns for a plurality of dynamic electromagnetic-wave filter groups of the at least one dynamic electromagnetic-wave filter.

9. The information leakage prevention shield device according to claim 1, wherein the at least one dynamic electromagnetic-wave filter is a plurality of dynamic electromagnetic-wave filters, and
the controller outputs a modulation signal based on respectively different time variation patterns for the plurality of dynamic electromagnetic-wave filters.

10. The information leakage prevention shield device according to claim 1, further comprising a first interfering-wave generation device to emit an interfering electromagnetic wave with a frequency equal to a frequency of a leaked electromagnetic wave emitted from the dynamic electromagnetic-wave filter.

11. The information leakage prevention shield device according to claim 10, wherein the first interfering-wave generation device is disposed on a side opposite to a side on which the device is disposed with respect to the dynamic electromagnetic-wave filter.

12. The information leakage prevention shield device according to claim 1, further comprising a second interfering-wave generation device disposed on a side on which the device is disposed with respect to the dynamic electromagnetic-wave filter and to emit an interfering electromagnetic wave with a frequency equal to a frequency of an electromagnetic wave emitted from the device.

13. The information leakage prevention shield device according to claim 1, further comprising:
a third interfering-wave generation device to emit an interfering electromagnetic wave with a frequency different from a frequency of an electromagnetic wave emitted from the device; and an interfering-wave dynamic electromagnetic-wave filter to operate with a frequency of the interfering electromagnetic wave from the third interfering-wave generation device as a filter frequency.

14. The information leakage prevention shield device according to claim 13, wherein a frequency of an interfering leaked electromagnetic wave emitted from the interfering-wave dynamic electromagnetic-wave filter is equal to a frequency of a leaked electromagnetic wave emitted from the dynamic electromagnetic-wave filter.

\* \* \* \* \*